May 17, 1932. J. W. CLINKSCALES, JR., ET AL  1,858,579
GAUGING DEVICE
Filed Jan. 26, 1928

Inventors:
John W. Clinkscales, Jr.,
Frank C. Cutting,
by Ripsey & Slingsland
Their Attorneys.

Patented May 17, 1932

1,858,579

UNITED STATES PATENT OFFICE

JOHN W. CLINKSCALES, JR., OF BRAMAN, AND FRANK C. CUTTING, OF TULSA, OKLAHOMA, ASSIGNORS TO SHELL PETROLEUM CORPORATION, A CORPORATION OF VIRGINIA

GAUGING DEVICE

Application filed January 26, 1928. Serial No. 249,645.

This invention relates to gauging devices, and more particularly to gauges for gauging tank cars under pressure, and consists in the novel construction hereinafter disclosed.

An object of the invention is to provide a gauging device which may be conveniently operated in filling tank cars under pressure in which there is included an adjustable tube with means in connection with the tube for predetermining its position in the tank to facilitate the filling operation of the tank.

Another object of the invention is to equip a device of the class described with a thermometer so arranged in connection with an adjustable tube that the temperature of a sample of the contents of the car may be ascertained while the sample is held under the same pressure conditions as obtain in respect of the bulk contents of the tank.

Figure 1:
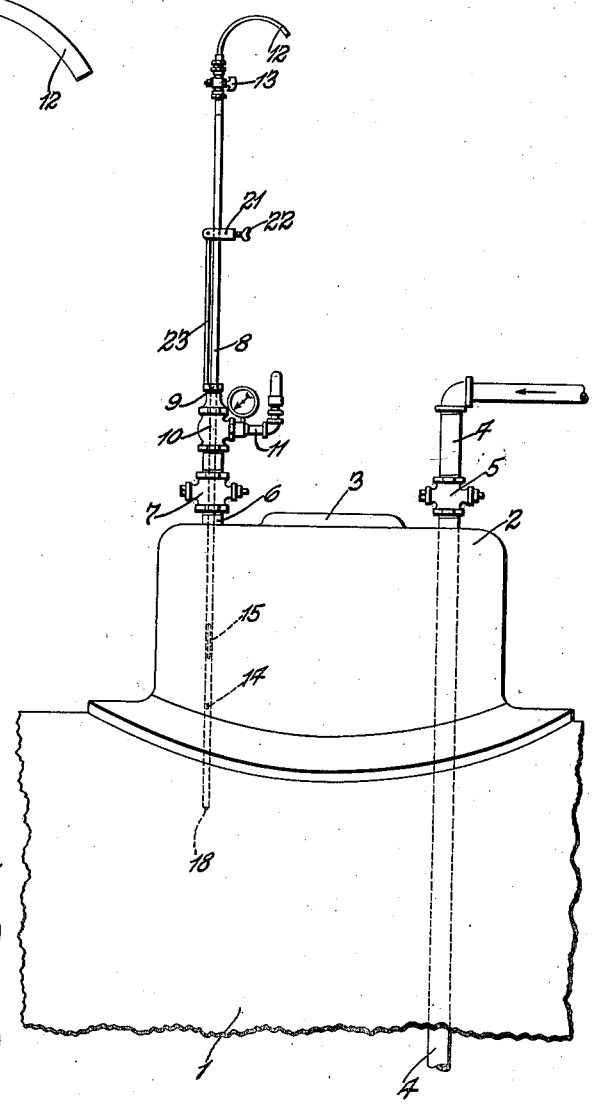

Additional advantages of the construction will be understood from the following detailed description thereof, taken in connection with the accompanying drawings in which Fig. 1 is a fragmentary view of a portion of the tank and dome showing the construction of the invention associated therewith.

Figure 2:
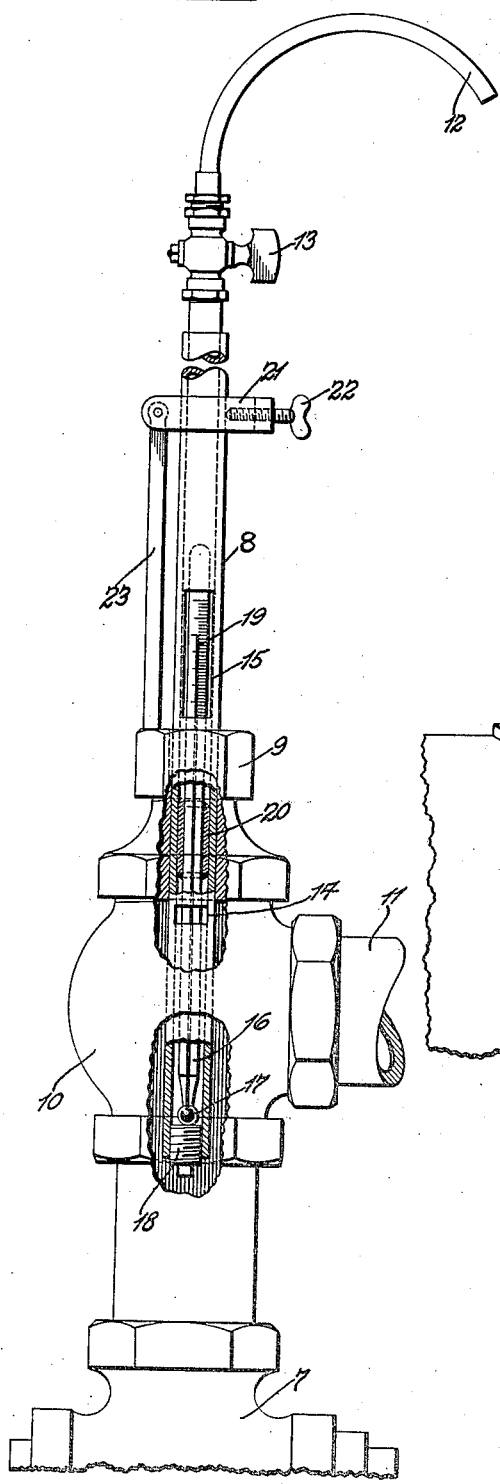

Fig. 2 is an enlarged view partially in section illustrating further details of the construction of the present invention.

In the embodiment of the invention illustrated in the drawings, 1 indicates a portion of a tank wall having a dome 2 connected therewith, said dome being provided with the usual dome cover 3. A pipe 4 extends through the dome and into the interior of the tank, said pipe 4 constituting the loading line. The pipe 4 is equipped with a valve 5 controlling the inflow of the liquid loaded into the tank. The dome cover is also provided with an outlet pipe 6 constituting the vent line, said pipe 6 having connected thereto a plug valve 7 with which the gauging device is connected.

The gauging device proper of the invention includes a tube or pipe 8 which passes through a packing nut 9 connected with the upper part of an angle pipe fitting 10, said pipe fitting, in turn, being removably connected with the plug valve 7. The angle pipe fitting 10 carries the usual assembly 11 including a pressure gauge and pop valve.

The tube 8 is equipped at its upper end with an outlet nozzle 12 controlled by a valve 13. The tube 8 adjacent to its lower end is provided with two openings through the wall thereof spaced apart and arranged at a sufficient interval so that when the one is exposed above the top edge of the packing nut 9 the other will be within the pipe fitting 10. The lower opening 14 is of relatively narrow width while the opening 15 is elongated providing an open space or window through the wall of the tube.

A thermometer 16 is inserted within the lower end of the tube 8 so that the bulb end 17 lies adjacent to the bottom of the tube, said tube being closed at the bottom by a screw plug 18 threading into the end of the tube. The thermometer extends upwardly a sufficient distance so that a scale 19 thereof registers with the opening 15. The thermometer is sealed and held in proper adjustment in the tube by a quantity of packing material 20, said packing being disposed intermediate the openings 14 and 15.

The tube 8 is equipped with an adjusting device comprising a clamp member 21 fitting around the tube 8 and equipped with a thumb screw 22 so that the member 21 may be set at any longitudinal adjustment on the tube and held in position by tightening the screw 22. A rod 23 is pivoted to the member 21, the said rod 23 being of a predetermined length so that it serves for a gauge to determine the extent of movement of the tube 8.

From the foregoing description of the construction it will be understood that the device operates substantially as follows in filling the tank and sampling the contents thereof:

Initially, in loading a car, the dome cover is removed and the car is inspected and the tank outlet valve is closed. A gauging device is then assembled by screwing the angle pipe fitting 10 into the valve 7. The plug valve 7 is then opened and the tube 8 is adjusted downwardly through the packing nut 9 until the top of the opening 15 is level with the top of the shell of the car. The member 21 is then clamped to the tube 8 by setting the screw 22 and is positioned on said tube so that the end of the rod 23 rests upon the top of the packing nut 9. The rod 23 is then swung laterally to a horizontal position and the tube is lowered until the member 21 rests upon the top of the packing nut, thus lowering the tube into the shell of the car a distance equal to the length of the rod 23.

After the tube 8 has been adjusted as above described the dome cover is then replaced and the liquid to be loaded into the car is pumped through the loading line. When gasoline, or other volatile liquid, is loaded into the car the valve 13 is opened during the initial loading operation and, therefore, a small amount of gas is vented until the liquid level reaches the top of the opening 15. The liquid then flows upwardly through the tube and out of the nozzle 12, thereby serving as an indication to the operator that the level in the car is the predetermined distance below the shell. The operator then raises the tube and resets the rod 23 on the top of the packing nut 9 after which the liquid is slowly introduced into the tank until liquid flows again from the nozzle 12 thereby indicating that the car has been filled. The valve 13 is then closed and the member 21 released from the tube and the tube adjusted downwardly into the tank. A sample may then be taken through the nozzle 12 by opening the valve 13.

In the shipment of gasoline, or other volatile liquids, car capacities are required to be adjusted for temperature and the true determination of the temperature of the contents of the car is essential in determining the proper outage to conform with regulations. Therefore, it is important that the temperature shall be taken accurately and under the same conditions as exist within the tank.

In determining the temperature of the car contents after the car has been filled, as hereinbefore described, the tube 8 is raised until the packing 20 between the openings 14 and 15 coincides with the packing nut 9. This adjustment leaves the opening 14 in communication with the interior of the tank which is sealed against the atmosphere, while the opening 15 is brought to a position above the top of the packing nut 9 so that the thermometer scale may be accurately read. It will be understood that the well formed in the tube below the opening 14 into which the bulb of the thermometer projects is filled with the liquid, the temperature of which is to be taken, and that such liquid will be subjected to the same temperature and pressure conditions as exist within the tank and there will be no vaporization and the temperature remains constant. Therefore, the thermometer reading will accurately reflect the temperature of the car contents.

After the temperature of the car contents has been ascertained the tube may be readily withdrawn through the valve 7 and the valve closed. The gauging apparatus may then be removed by unscrewing the angle pipe fitting 10 and its connections from the valve 7.

It will be understood that the invention may be modified in a number of particulars without departing from the spirit and scope thereof. We do not limit ourselves to unessential details of construction, but what we claim and desire to secure by Letters Patent is:—

1. In a gauging device for tank cars, the combination of a sealed member adapted to be placed in communication with the interior of the tank, a tube slidably mounted through said sealed member, said tube having spaced openings through its walls, a thermometer supported in said tube and having a scale registering with one of said openings, and packing material between the tube and thermometer and located between said openings whereby the temperature of a sample under conditions within the tank may be read from the exterior of the car while the liquid around the bulb of the thermometer is subjected to the conditions within the tank.

2. The combination of a tank having a vent opening, a valve connected with said vent opening, a packed housing connected with said valve, a tube slidably mounted in said packed housing and through said valve, said tube having spaced openings through the wall thereof, a thermometer located in said tube with the bulb end thereof near the bottom of said tube, a sealed partition in the tube between said openings, the thermometer scale being visible through the upper opening thereof, and a valve outlet nozzle at the upper end of said tube.

3. A device of the class described including a packed housing adapted to be connected with a valve opening to a tank, a tube slidably mounted in said packed housing, a thermometer located in said tube, and a sealed partition wall between the tube and the thermometer and located between the bulb and scale end thereof, said tube having a passage communicating with the interior of the tube below said partition, and a window above said partition through which the scale of the thermometer is visible.

4. A gauging device for tank cars comprising a housing adapted to be mounted in a tank car opening, a tube having a window therein slidably mounted in said housing and adapted to be inserted therethrough into the tank, a thermometer located in said tube and having a scale registering with the window in the tube, means supported by said tube for supporting said thermometer in said tube, packing means between the tube and the housing, a valved outlet nozzle in the upper end of said tube wholly above the window, an adjustable member slidable on the tube and adapted to be clamped in adjusted positions thereon, and a rod connected with said adjustable member for determining the extent of movement of said tube into said tank.

5. A gauging device for tank cars comprising a tube having a window therein, a member in which said tube is slidably operable, packing means between the tube and said member, a thermometer located in said tube and having a scale registering with the window in the tube, an outlet nozzle at the top of said tube, a member adjustable along and adapted to be clamped in selected position on said tube, and a rod connected to said device adapted to hold said tube at a predetermined elevation in the member in which it is mounted.

JOHN W. CLINKSCALES, Jr.
FRANK C. CUTTING.